US006963566B1

(12) United States Patent
Kaniz et al.

(10) Patent No.: US 6,963,566 B1
(45) Date of Patent: Nov. 8, 2005

(54) MULTIPLE ADDRESS LOOKUP ENGINES RUNNING IN PARALLEL IN A SWITCH FOR A PACKET-SWITCHED NETWORK

(75) Inventors: Marufa Kaniz, Sunnyvale, CA (US); Somnath Viswanath, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 865 days.

(21) Appl. No.: 09/851,935

(22) Filed: May 10, 2001

(51) Int. Cl.[7] ............................................. H04L 12/56
(52) U.S. Cl. ....................... 370/392; 370/389; 370/412
(58) Field of Search ................................ 370/389, 392, 370/412

(56) References Cited

U.S. PATENT DOCUMENTS

| | | | | |
|---|---|---|---|---|
| 6,577,636 | B1 * | 6/2003 | Sang et al. ............... | 370/395.7 |
| 6,763,023 | B1 * | 7/2004 | Gleeson et al. ............ | 370/392 |
| 6,768,738 | B1 * | 7/2004 | Yazaki et al. ............. | 370/392 |
| 2002/0101867 | A1 * | 8/2002 | O'Callaghan et al. ...... | 370/389 |
| 2004/0085962 | A1 * | 5/2004 | Sugai et al. ............... | 370/392 |
| 2004/0170176 | A1 * | 9/2004 | Kadambi et al. ........... | 370/392 |

OTHER PUBLICATIONS

U.S. Appl. No. 09/851,939, filed May 10, 2001.

* cited by examiner

*Primary Examiner*—Chi Pham
*Assistant Examiner*—Rhonda Murphy
(74) *Attorney, Agent, or Firm*—Harrity & Snyder LLP

(57) ABSTRACT

A multiport device includes an internal rules checking (IRC) circuit that makes frame forwarding decisions for frames received from a network. The IRC circuit includes multiple frame lookup components implemented in parallel. More particularly, each of the multiple frame lookup components includes a source address lookup component and a destination address lookup component, and an address table. The source address lookup component and the destination address lookup component accesses the address table to determine the correct forwarding information for a frame. If an address is not present in the table, a source address learning component updates the table. The source address learning component may be shared by each of the multiple frame lookup components.

19 Claims, 8 Drawing Sheets

MULTIPLE ADDRESS LOOKUP ENGINES RUNNING IN PARALLEL IN A SWITCH FOR A PACKET-SWITCHED NETWORK

CROSS-REFERENCE TO RELATED APPLICATIONS

This application is related to the following commonly assigned, copending application, Ser. No. 09/851,939 filed May 10, 2001, and entitled: "Single Address Lookup Table With Multiple Address Lookup Engines Running in Parallel in a Switch for a Packet-Switched Network."

BACKGROUND OF THE INVENTION

1. Technical Field

The present invention relates generally to switches in a packet switched network, and more specifically, to address lookup tables and corresponding circuitry for locating information relating to packets in a packet switched network.

2. Background Art

In computer networks, a plurality of network stations are interconnected via a communications medium. For example, Ethernet is a commonly used local area network scheme in which multiple stations are connected to a single shared or dedicated serial data path. These stations often communicate With a switch located between the shared data path and the stations connected to that path. Typically, the switch controls the communication of data packets on the network.

The network switch includes switching logic for receiving and forwarding data frames to the appropriate destinations. One arrangement for generating a frame forwarding decision uses a direct addressing scheme, where the network switch includes an address table storing switching information for the destination addresses.

For example, a frame may be received by the network switch with header information indicating the source address and destination address of the frame. The switching logic accesses the address table using the source address and destination address as lookups to find the appropriate frame forwarding information. The switch then uses this information to send the frame to the appropriate destination.

When all of the stations connected to the network are simultaneously operating, packet traffic on the serial path can be heavy with little time between packets. Accordingly, it is desirable to look up the frame forwarding information in the address lookup table as quickly as possible.

Thus, there is a need in the art to improve the functionality of the lookup table and its associated control circuitry in network devices, such as an Ethernet switch.

SUMMARY OF THE INVENTION

The features and advantages of the invention will be set forth in part in the description which follows, and in part will be obvious from the description, or may be learned by practice of the invention. The advantages of the invention will be realized and attained by means of the elements and combinations particularly pointed out in the appended claims.

According to one aspect of the present invention, a multiport device is provided. The device comprises a plurality of elements, including: receive ports, transmit ports, an internal rules checking circuit, and a port vector queue. The internal rules checking circuit receives input frames from receive ports and is configured to determine frame forwarding information that indicates from which transmit ports the received frames should be transmitted. The internal rules checking circuit additionally includes frame lookup components operating in parallel and each associated with an address table. The frame lookup components synchronously receive one of the frames received by the internal rules checking circuit and look up the frame forwarding information for the received frame from the address table associated with the frame lookup component.

A second aspect of the present invention is directed to a method of determining frame forwarding information for frames received in a network device. The method includes receiving frames at the network device, the frames including a source field indicating the source of the frame and a destination field indicating an intended destination for the frame. Further, the frames are distributed among a number of frame lookup components implemented in parallel with one another, and each of the frame lookup components is coupled to an associated address table and configured to look up a frame forwarding field for each of the received frames from the associated address table, the frame forwarding field describing the frame forwarding information. The frame forwarding fields from the frame lookup components are received and assembled into a single stream of frame forwarding fields. Finally, the frames associated with the frame forwarding fields are transmitted to output ports of the network switch based on the content of the frame forwarding fields.

BRIEF DESCRIPTION OF THE DRAWINGS

The accompanying drawings, which are incorporated in and constitute a part of this specification, illustrate an embodiment of the invention and, together with the description, explain the invention. In the drawings.

BEST MODE FOR CARRYING OUT THE INVENTION

Figure 1:
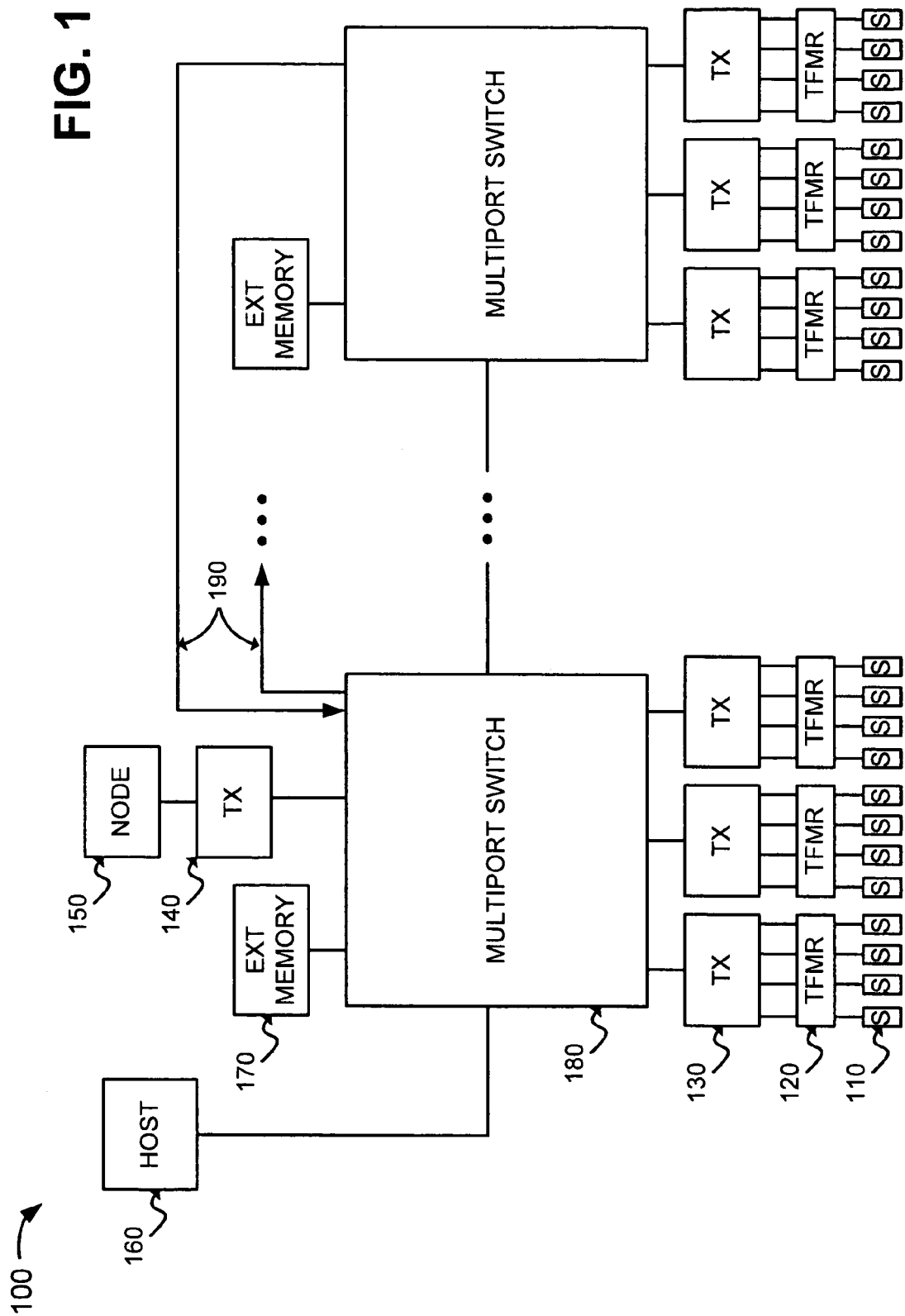
FIG. 1 is a block diagram of an exemplary system in which systems and methods consistent with the present invention may be implemented.

The following detailed description of the invention refers to the accompanying drawings. Like objects in the drawings may be referred to using the same reference numeral in different drawings. The detailed description does not limit the invention. Instead, the scope of the invention is defined by the appended claims and equivalents.

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
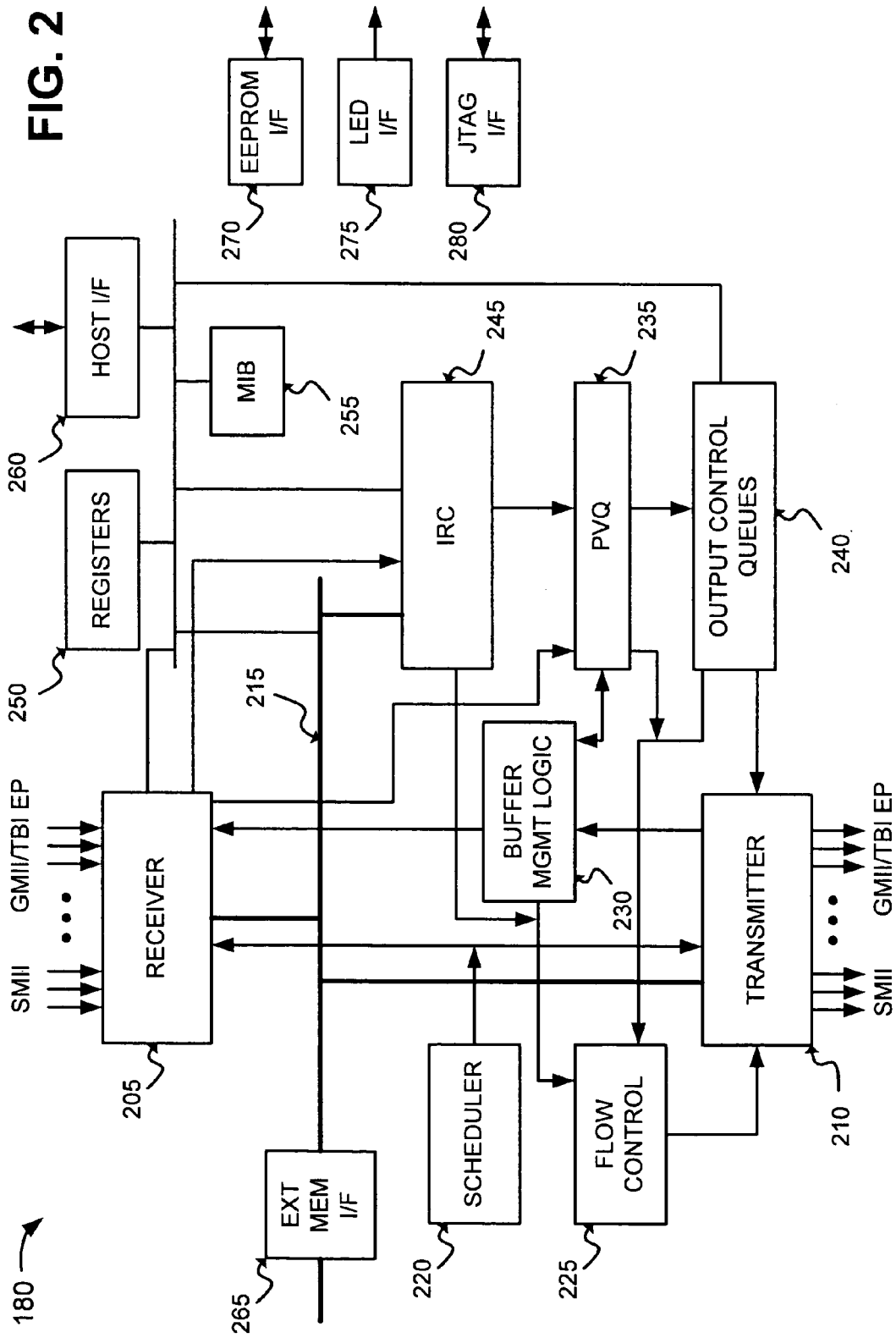
FIG. 2 is a detailed diagram of a multiport switch according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

Figure 3:
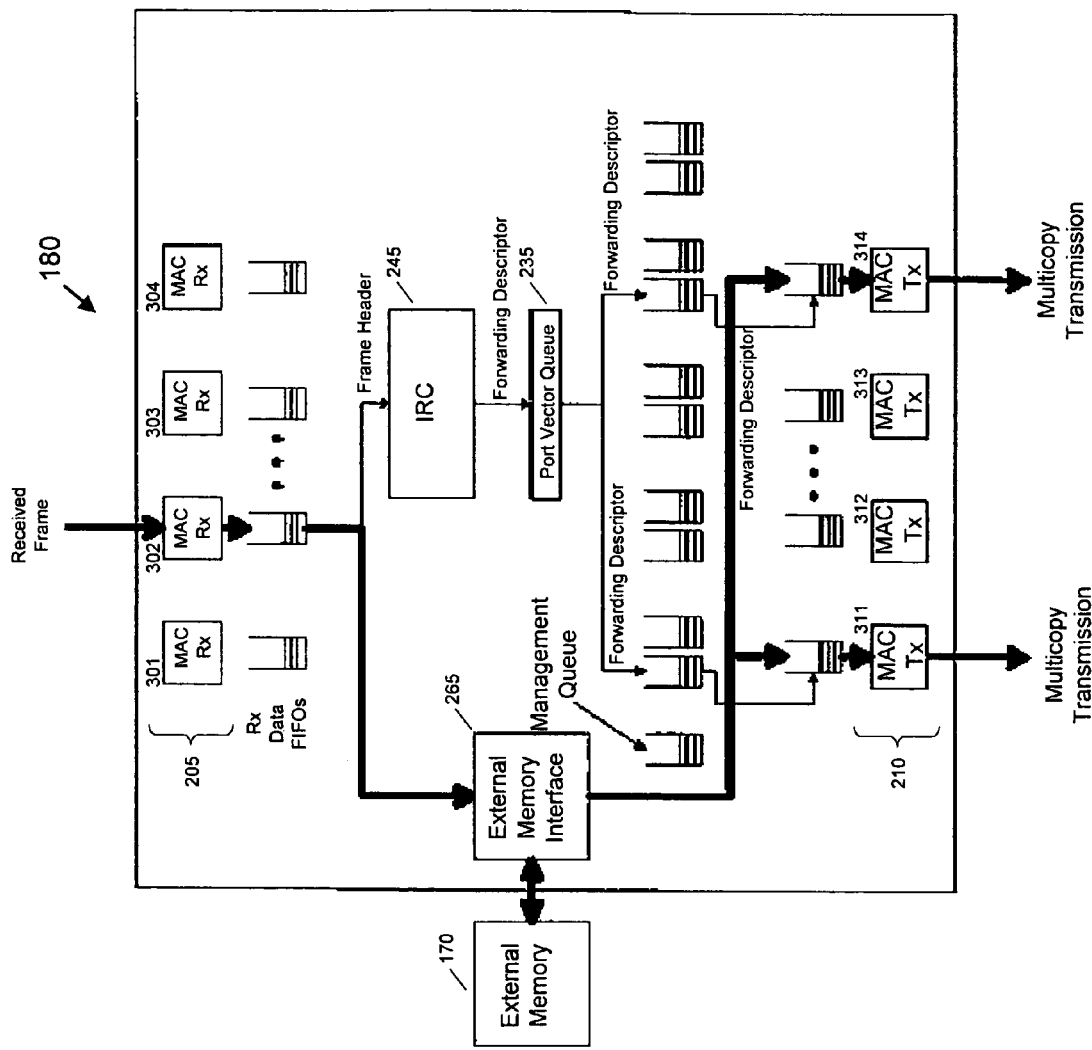
FIG. 3 is a diagram illustrating the data flow path of a frame through a multiport switch.

FIG. 3 is a diagram illustrating, at a high level, the data flow path of a frame through multiport switch 180. Each frame is received at one of the ports, labeled as ports 301–304, in receiver 205. Each frame includes a header portion and a payload (frame data) portion. To conserve memory on switch 180, the multiport switch 180 splits the header portion from the payload portion. The payload portion may then be stored, by external memory interface 265, off-chip in external memory 170. The header is forwarded to IRC 245. Based on the information in the header, IRC 245 determines, using an address lookup table, the correct transmit port(s) 210 from which the frame is to be transmitted. The frame forwarding information is then input to PVQ 235, reunited with its payload portion in the output control queues 240, and transmitted on the appropriate one of the MAC transmission ports 210, labeled as ports 311–314.

As shown in FIG. 3, a frame is received on receive port 302 and transmitted from ports 311 and 314. This is called a multicast transmission. Frame transmission from one port is referred to as a unicast transmission.

Figure 4:
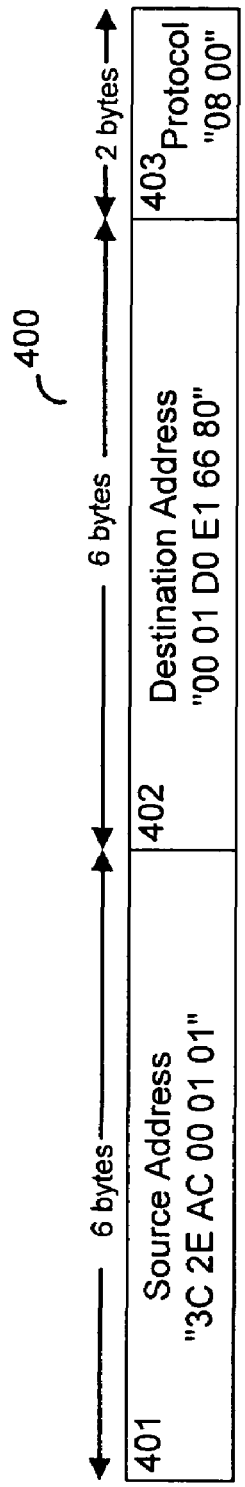
FIG. 4 is a diagram illustrating the header portion of an Ethernet frame.

FIG. 4 is a diagram illustrating the header portion of an Ethernet frame. Header 400 contains three fields: source address field 401, destination address field 402, and protocol field 403. The source address field is six bytes (48 bits) in length and identifies the node address of the source of the frame. Similarly, the destination address field 402 is a six-byte field that uniquely identifies the destination address. The source and destination address are also referred to as Media Access Control (MAC) addresses. Each MAC address is a unique number that distinguishes the network device with that particular address from all other network devices. No two networking devices should typically be assigned the same MAC address.

Protocol field 403 is a two byte field that represents the protocol that the Ethernet header 400 is framing. In the example shown, the value of the protocol field 403 is hex 08 00, which represents the IPv4 protocol.

The foregoing description of the switch architecture provides an overview of the switch operations in a packet switched network. A more detailed description of the features of the present invention as embodied, for example, in the multiport switch 180, is provided below.

Determining the Frame Forwarding

Information

As previously discussed, one of the functions performed by IRC (internal rules checker) 245 is determining the correct frame forwarding information for a received frame. This determination is made with the aid of an address lookup table and corresponding circuitry for accessing the address lookup table.

More specifically, IRC 245 uses the address fields of header 400 to generate a frame forwarding descriptor that includes the frame forwarding information and that identifies each transmission port 311–314 that should receive the frame.

Figure 5:
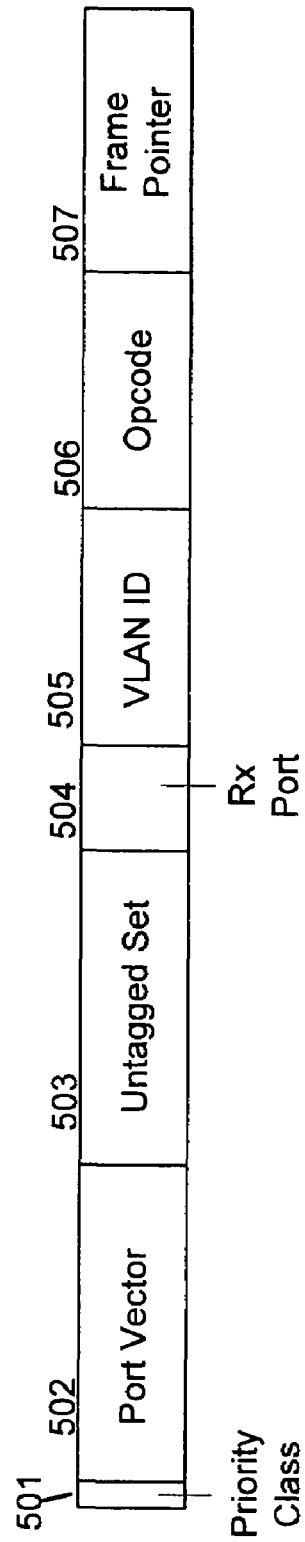
FIG. 5 is a diagram illustrating the structure of a frame forwarding descriptor.

The structure of a frame forwarding descriptor is shown in more detail in FIG. 5. Referring to FIG. 5, the priority class field 501 is a one-bit field that indicates the output priority queue in which the frame pointer should be placed, e.g., high priority or low priority. The port vector field 502 is a field that identifies each port(s) that should receive the data frame for transmission to its destination address. For example, bit 0 of the port vector field may correspond to port 0 (the management port) and each of the other bits may correspond to one of the MAC ports.

The untagged set field 503 is a field that indicates which ports should remove virtual local area network (VLAN) tag headers before transmitting frames. The untagged set is obtained from an untagged set table. The Rx port field 504 indicates the port from which the frame was received.

The VLAN ID field 505 includes the identifier associated with the frame. The opcode 506 is a field that contains instructions about how the frame should be modified before transmission and information that the host 160 can use for processing frames from the management queue. The frame pointer 507 contains the location of the frame stored in external memory 170.

Figure 6:
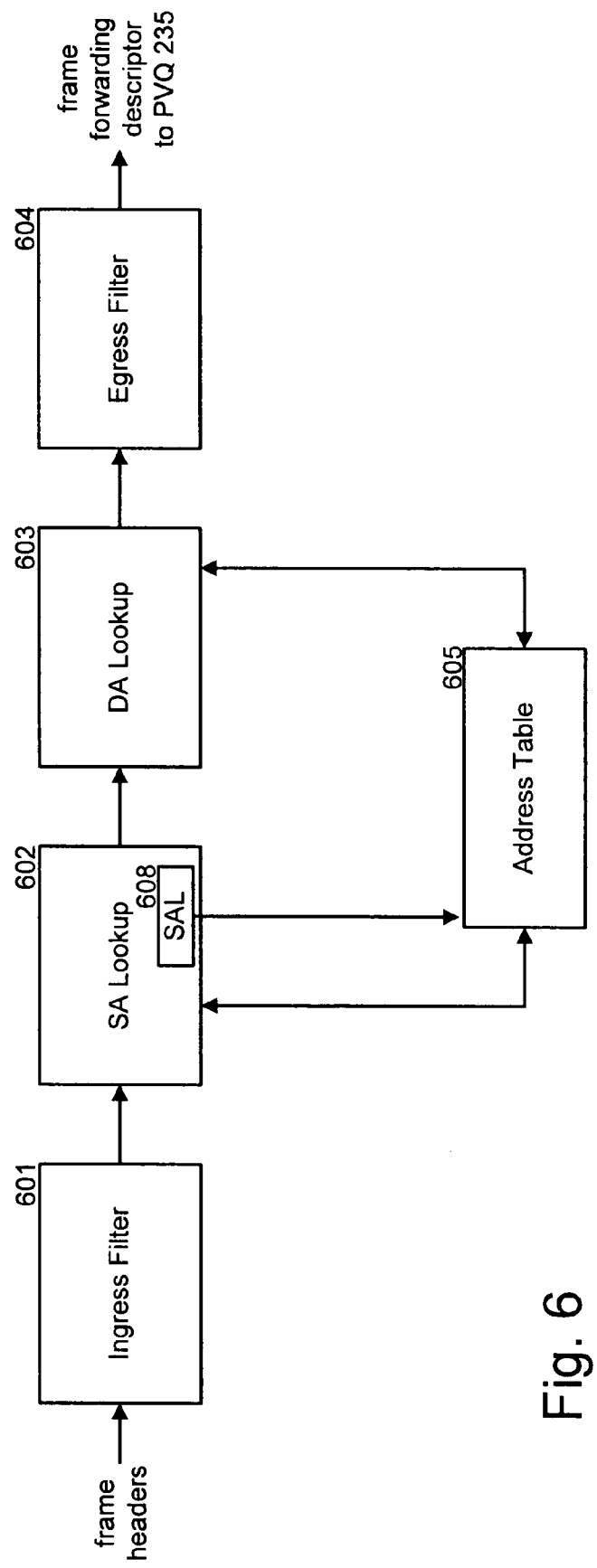
FIG. 6 is an exemplary diagram illustrating details of the internal rules checking circuit shown in FIG. 2.

FIG. 6 is a block diagram functionally depicting components in IRC 245. As shown, IRC 245 includes serially coupled ingress filter 601, source address (SA) lookup component 602, a destination address (DA) lookup component 603, and an egress filter 604. SA lookup component 602 and DA lookup component 603 may access address table 605 in determining the forwarding descriptor. Address table 605 is updated by source address learning (SAL) engine 608, which may be implemented as a part of SA lookup component 602.

Address table 605, as described in more detail below, stores associations between a frame's header information and its destination port. Frame header information enters IRC 245 at ingress filter 601, and flows through SA lookup component 602, DA lookup component 603, and egress filter 604 in a pipelined fashion. Thus, while SA lookup component 602 is processing a frame header, the previous frame header may be being processed by DA lookup component 603 and the succeeding frame header may be being processed by ingress filter 601.

In operation of the IRC 245, frame header information is received by ingress filter 601, which examines the frame header information and applies predetermined rules to determine, for example, whether the frame was received with errors. The frame is next passed to the SA lookup component 602, which uses address table 605 to keep track of active source addresses. More particularly, SA lookup component 602 queries address table 605 for an entry that corresponds to the source address field of the frame. If the address table 605 "knows" the source address (i.e., if an entry corresponding to the source address field 401 has been previously written to address table 605), the frame is passed to the DA lookup component 603. If the entry is not in address table 605, SA lookup component 602 initiates a "learn" operation by SAL 608, which responds by flooding the frame to all possible output ports of the multiport switch. When an indication of the correct output port(s) is subsequently received back by the IRC 245, SAL 608 appropriately updates address table 605 to indicate that the frame's source address has been learned and to include the correct output port(s) for the destination address of the frame.

Address table 605 may be implemented as a table containing an array of entries, such as 4096 entries. Each entry is written to the address table 605 at a table row address determined by a hashing function. If multiple table entries hash to the same table row, a pointer in the table row may be set to refer to the location H of the additional entries. More specifically, SA lookup component 602 and DA lookup component 603 determine the correct row in address table 605 to access by hashing a value based on the source and/or destination MAC addresses 401 and 402. A hash function, in general, generates an output value within a certain range based on an input value. For example, a hash function consistent with the present invention generates a 10 bit output value (i.e., a value between 0 and 1023) based on an input 48 bit value (i.e., the MAC address). The output hash value is then directly used to address one of 1024 table entries in address table 605. The other 3072 entries in address table 605 (assuming the address table is implemented with 4096 total rows) may be used to store "collision" entries that occur when multiple entries hash to the same row address. Other information, in addition to the MAC address, such as the VLAN Index, may be concatenated with the 48-bit MAC address and used as the input to the hash function.

Figure 7:
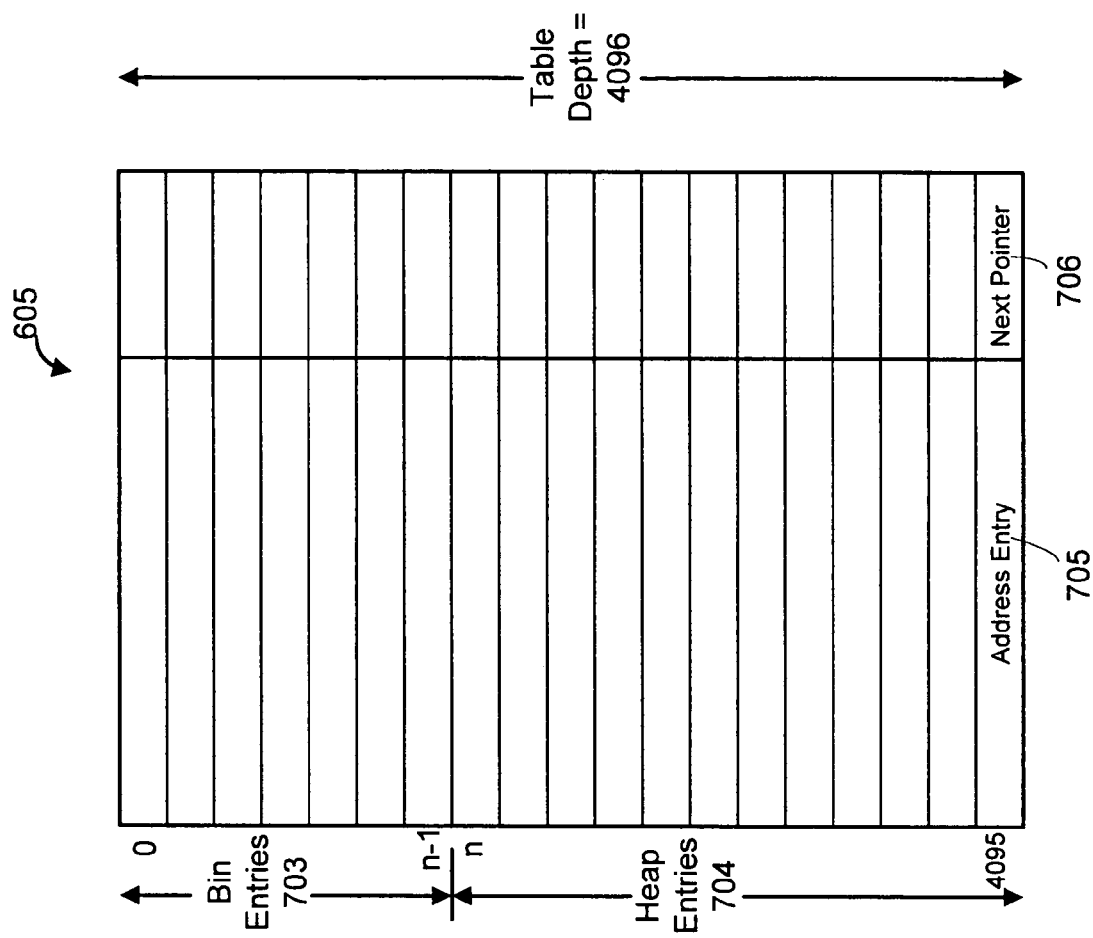
FIG. 7 is a diagram illustrating, in more detail, the address table shown in FIG. 6.

FIG. 7 illustrates the structure of address table 605 in detail. As shown, address table 605 contains 4096 rows (i.e., it is a 4k address table). The 4096 rows are divided into bin entries 703 (e.g., 1024 bin entries) and heap entries 704 (e.g., 3072 heap entries). Each bin entry 703 and heap entry 704 is divided into an address entry field 705 and a next pointer field 706. The address entry field 705 stores the substantive table entry, including the port vector, which lists the appropriate output ports, for the destination address. When collisions occur, the next pointer field 706 is used to store the row address in heap entry section 704 of the next entry in the chain. In this manner, if two entries hash to the same row address in bin entries 703, SAL 608 stores the second entry in an open entry in the heap entries 704. The next pointer field 706 stores the corresponding address of the heap entry. If a third entry hashes to the same bin address, SAL 608 stores the third entry in an open heap entry, and sets the next pointer field 706 of the second entry to the row address of the third entry. In this manner, multiple entries that hash to the same bin address can be stored as a linked chain of entries in address table 605.

DA lookup component 603, after receiving a frame from SA lookup component 602, retrieves the output port vector field from address table 605. Frame forwarding descriptor information output from DA lookup component 603 is forwarded to egress filter 604 and then to PVQ 235. Egress filter 604 checks the VLAN member set for each transmit port and constructs the forwarding descriptor that is passed to the PVQ 235.

Figure 8:
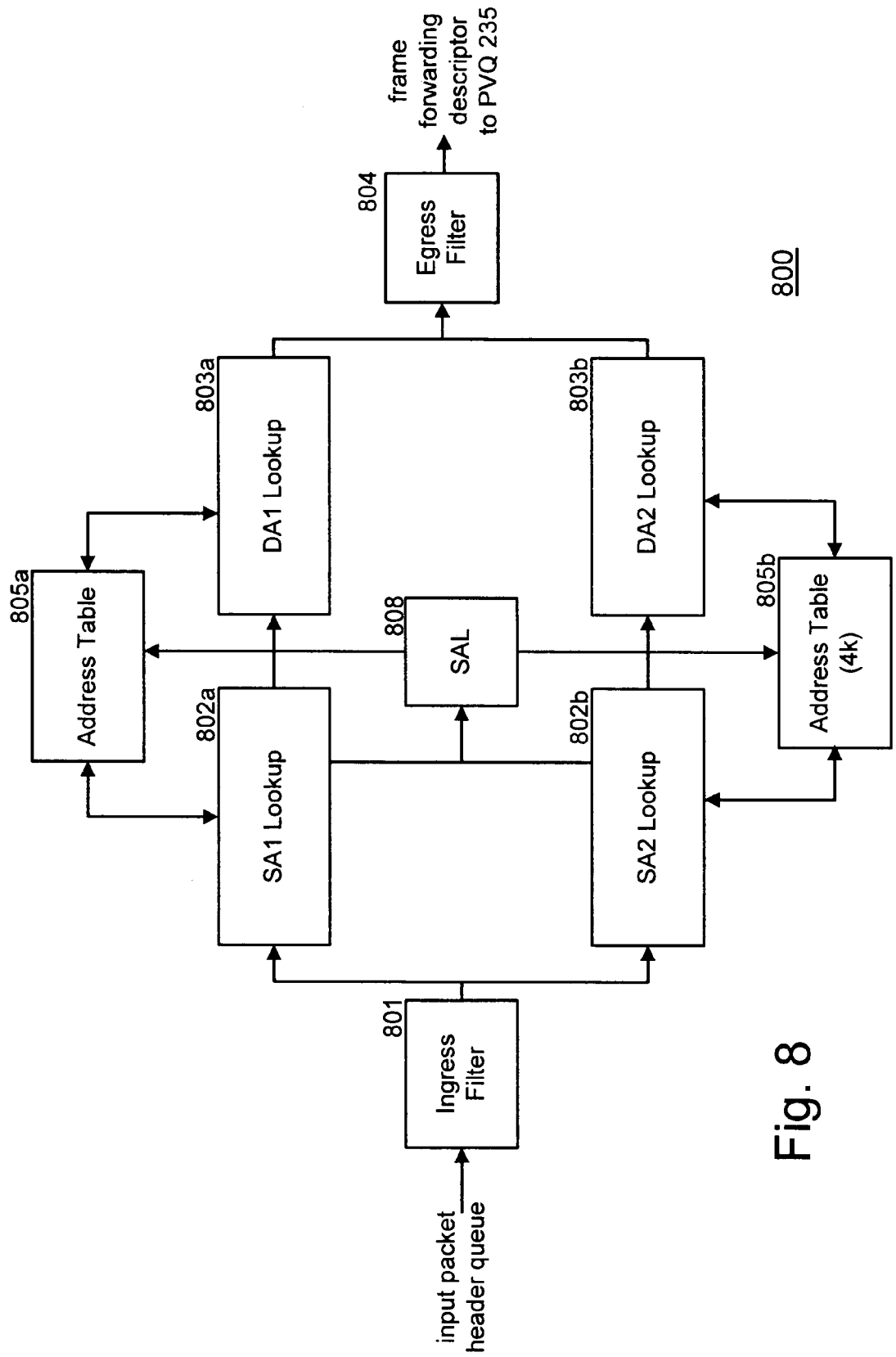
FIG. 8 is a diagram illustrating details of the internal rules checking circuit shown in FIG. 2, consistent with a first exemplary implementation of the present invention.

FIG. 8 is an exemplary block diagram illustrating operational aspects of an IRC 800 consistent with the present invention. IRC 800 performs functionally equivalent operations as the IRC shown in FIG. 6. IRC 800, however, unlike the IRC shown in FIG. 6, includes multiple source address lookup components, destination address lookup components, and address lookup tables. These components are implemented in parallel to increase frame throughput.

More specifically, as shown in FIG. 8, ingress filter 801 is connected to two source address lookup components, labeled as SA1 802a and SA2 802b. A frame header output from SA1 802a is input to destination address component DA1 803a, and a frame header output from SA2 802b is correspondingly input to destination address component DA2 803b. Egress filter 804 receives the output of both of DA1 803a and DA2 803b.

Ingress filter 801 and egress filter 804 perform substantially the same functions as ingress filter 601 and egress filter 604. However, as shown in FIG. 8, ingress filter 801 divides its output between the two SA lookup components 802a and 802b. It may divide its output by alternating received frames between SA lookup components 802a and 802b. Egress filter 804 combines the output of DA lookup components 803a and 803b into a single output stream of packet frame forwarding descriptors.

SA1 lookup component 802a and DA1 lookup component 803a perform address table lookups in address table 805a. Similarly, SA2 lookup component 802b and DA2 lookup component 803b perform address table lookups in address table 805b. Address tables 805a and 805b may each include, as with the address table shown in FIG. 7, 4096 row entries. A single source address learning (SAL) engine 808 handles address learning requests from SA learning component 802a and SA learning component 802b. SAL engine 808 may give equal priority to requests from SA 802a and SA 802b.

As can be seen from FIG. 8, IRC 800 effectively includes multiple IRC branches operating in parallel with one another. That is, SA1 lookup component 802a, DA1 lookup component 803a, and address table 805a operate as the first branch, and SA2 lookup component 802b, DA2 lookup component 803b, and address table 805b operate in parallel as the second branch. Each branch operates as a two-stage pipeline through which the frame forwarding descriptor information may be synchronously moved. Each branch operates similarly to the operation of the single branch IRC shown in FIG. 6 by SA lookup component 602, DA lookup component 603, and address table 605. In this manner, by increasing the number of simultaneously operating frame lookup components (i.e., the SA and DA lookup components), total throughput through the IRC 800 can be increased.

Address tables 805a and 805b may include, for each entry, an aging bit that allows SAL 808 to keep track of the age of an entry and delete entries that have not been used for a predetermined amount of time.

Although a single SAL 808 is shown in FIG. 8, in an alternate implementation, two SAL components could be used-one for each branch of the pipeline.

Figure 9:
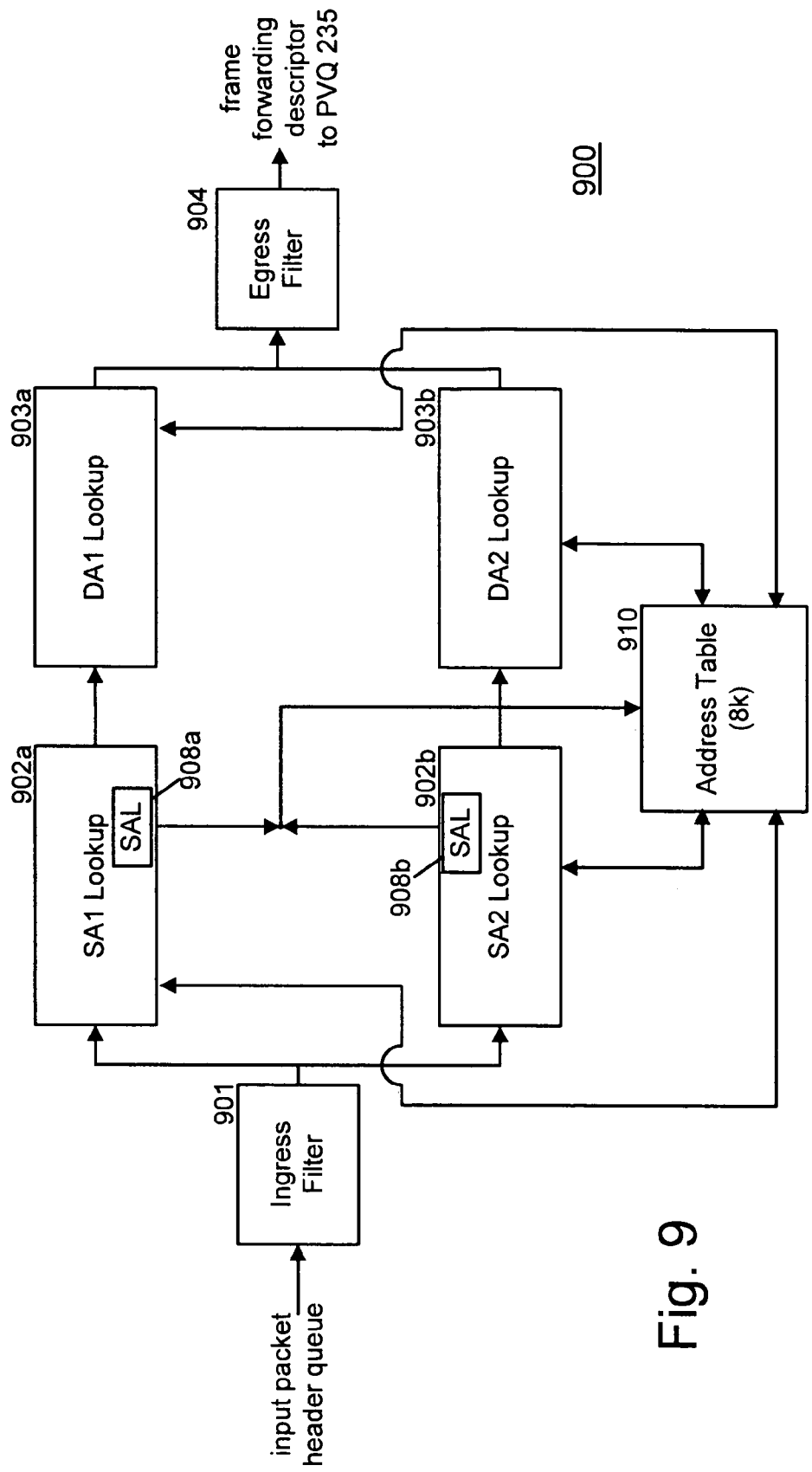
FIG. 9 is a diagram illustrating details of the internal rules checking circuit shown in FIG. 2, consistent with a second exemplary implementation of the present invention.

FIG. 9 is an exemplary block diagram illustrating operational aspects of an IRC consistent with another aspect of the present invention.

IRC 900, as with IRC 800 (FIG. 8), includes dual SA and DA lookup components. More specifically, as shown in FIG. 9, IRC 900 includes an ingress filter 901 that is connected to two source address lookup components, labeled as SA1 902a and SA2 902b. A frame header output from SA1 902a is input to destination address lookup component DA1 903a, and a frame header output from SA2 902b is correspondingly input to destination address lookup component DA2 903b. Egress filter 904 receives the output of both of DA1 903a and DA2 903b.

Each of SA1 902a and SA2 902b may include separate source address learning (SAL) engines 908a and 908b, respectively.

In operation, ingress filter 901, egress filter 902, SA1 lookup component 902a, SA2 lookup component 902b, DA1 lookup component 903a, and DA2 lookup component 903b function similarly to the corresponding components shown in FIG. 8. However, as shown in FIG. 9, a single, larger address table 910 replaces the dual address tables 805a and 805b. SALs 908a and 908b write to the single address table 910. In this manner, header information written to address table 910 at the request of SA1 lookup component 902a can later be accessed by DA1 lookup component 903a as well as SA2 or DA2 lookup components 902b or 903b, respectively.

Because SA1 902a and SA2 902b are accessing the same address table 910, separate time-slots may be allocated to SA1 902a and SA2 902b. That is, during a particular time-slot in the pipeline, only one of SA1 902a and SA2 902b may be allowed to access address table 910. Similarly, only one of DA1 903a and DA2 903b may be allowed to access address table 910 during a single time-slot.

Because address table 910 includes more entries than either address tables 805a or 805b, the frequency of table hits (i.e., a searched-for entry is present in the table), will increase. Thus, the total wire speed of the IRC may increase.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although IRCs 800 and 900 are shown with two pipelines, IRCs 800 and 900 could alternately be implemented with more than two pipelines. In addition, the particular size of the address tables may be modified in other implementations consistent with the present invention.

The scope of the invention is defined by the claims and their equivalents.

What is claimed is:

1. A multiport device comprising:
    a plurality of receive ports, the receive ports receiving frames in a packet-switched network, the frames each having a source field indicating the source of the frame and a destination field indicating an intended destination for the frame;
    a plurality of transmit ports, the transmit ports configured to transmit the frames in the packet-switched network; and
    an internal rules checking circuit coupled to the receive ports and configured to determine frame forwarding information that indicates which of the plurality of transmit ports the received frames should be transmitted from, the internal rules checking circuit including
    a first address table including a plurality of addressable table entries for storing frame forwarding information,
    a first source address lookup component configured to access the first address table at a table address based on at least the source field of the frames,
    a first destination address lookup component configured to access the first address table at a table address based on at least the destination field of the frames to obtain the frame forwarding information of the frame,
    a second address table including a plurality of addressable table entries for storing frame forwarding information,
    a second source address lookup component configured to access the second address table at a table address based on at least the source field of the frames,
    a second destination address lookup component configured to access the second address table at a table address based on at least the destination field of the frames to obtain the frame forwarding information of the frame, and
    a source address learning engine connected to the first and second source address lookup components and the first and second address tables, the source address learning engine, in response to a request from the first source address lookup component relating to a first frame, updating the first address table to include information relating to the frame forwarding information for the first frame, and in response to a request from the second source address lookup component relating to a second frame, updating the second address table to include information relating to the frame forwarding information for the second frame.

2. The multiport device of claim 1, wherein the internal rules checking circuit further includes:
    an ingress filter coupled to the plurality of receive ports, the ingress filter distributing header information of each of the received frames to one of the first and second source address lookup components.

3. The multiport device of claim 2, wherein the internal rules checking circuit further includes:
    an egress filter coupled to an output of the first and second destination address lookup components, the egress filter receiving frame descriptor information from the first and second destination address lookup components and transmitting the received frame descriptor information into a single output stream of frame descriptors.

4. The multiport device of claim 3, wherein the first source address lookup component and the first destination address lookup component function as a first frame pipeline and the second source address lookup component and the second destination address lookup component function as a second frame pipeline.

5. The multiport device of claim 3, further including:
    a port vector queue coupled to the egress filter, the port vector queue receiving the single output stream of frame descriptors and forwarding the frames corresponding to the frame descriptors to appropriate ones of the transmit ports.

6. The multiport device of claim 1, wherein the source address learning engine gives equal priority to requests from the first source address lookup component and the second source address lookup component.

7. The multiport device of claim 1, wherein the table address accessed by the first and second source address lookup component is derived from a hashing algorithm that hashes at least the source field of the frame.

8. The multiport device of claim 1, wherein the table address accessed by the first and second destination address lookup component is derived from a hashing algorithm that hashes at least the destination field of the frame.

9. A multiport device comprising:
    a plurality of receive ports, the receive ports receiving frames in a packet-switched network, the frames having a source field indicating the source of the frame and a destination field indicating an intended destination for the frame;
    a plurality of transmit ports, the transmit ports configured to transmit the frames in the packet-switched network;
    an internal rules checking circuit coupled to receive input frame header information from the receive ports and configured to determine frame forwarding information that indicates which of the plurality of transmit ports the received frames should be transmitted from, the internal rules checking circuit including a plurality of frame lookup components operating in parallel, each of the plurality of frame lookup components being associated with an address table, synchronously receiving the frame header information received by the internal rules checking circuit, and identifying the frame forwarding information for the received frame header information from the address table associated with the frame lookup component; and
    a port vector queue connected to the internal rules checking circuit, the port vector queue receiving the frame forwarding information identified by the internal rules checking circuit and forwarding the frame forwarding information to appropriate ones of the transmit ports.

10. The multiport device of claim 9, wherein each of the plurality of frame lookup components in the internal rules checking circuit further comprises:
    a source address lookup component configured to access the address table of the associated frame lookup component at a table address based on at least the source field of the received frame header information, and a destination address lookup component configured to access the address table of the associated frame lookup component at a table address based on at least the destination field of the received frame header information to obtain the frame forwarding information for the received frame.

11. The multiport device of claim 10, wherein the internal rules checking circuit further includes:

a source address learning engine coupled to each of the frame lookup components, the source address learning engine, in response to a request from a source address lookup component, updating the address table associated with the requesting source address lookup component to include the frame forwarding information for the frame.

12. The multiport device of claim 9, wherein the internal rules checking circuit further includes:

an ingress filter coupled to the plurality of receive ports, the ingress filter distributing each of the received frame header information to one of the plurality of frame lookup components.

13. The multiport device of claim 9, wherein the internal rules checking circuit further includes:

an egress filter coupled to an output of each of the plurality of frame lookup components, the egress filter receiving the frames from each of the plurality of frame lookup components and transmitting a single output stream of frame descriptors.

14. The multiport device of claim 11, wherein the source address learning engine gives equal priority to requests from each of the frame lookup components.

15. The multiport device of claim 10, wherein the table address accessed by the source address lookup components is derived from a hashing algorithm that hashes at least the source field of the frame header.

16. The multiport device of claim 10, wherein the table address accessed by the destination address lookup component is derived from a hashing algorithm that hashes at least the destination field of the frame header.

17. A method of determining frame forwarding information for frames received in a network device, the method comprising:

receiving frames at the network device, the frames including a source field indicating the source of the frame and a destination field indicating an intended destination for the frame;

distributing the frames among a plurality of frame lookup components implemented in parallel with one another, each of the frame lookup components coupled to an associated address table and configured to look up a frame forwarding descriptor for each of the received frames from the associated address table, the frame forwarding descriptor identifying the frame forwarding information;

receiving the frame forwarding descriptors from the plurality of frame lookup components and transmitting the frame forwarding descriptors to an output queue corresponding to the frame forwarding descriptor; and transmitting the frames associated with the frame forwarding descriptors to output ports of the network device based on the content of the frame forwarding descriptors.

18. The method of claim 17, wherein the frame forwarding descriptors include a port vector field that indicates appropriate ones of the output ports.

19. A multiport device for determining frame forwarding information for frames received in a network, the multiport device comprising:

means for receiving frames, the frames including a source field indicating the source of the frame and a destination field indicating an intended destination for the frame;

means for distributing the frames among a plurality of frame lookup components implemented in parallel with one another, each of the frame lookup components coupled to an associated address table and configured to identify a frame forwarding descriptor for each of the received frames from the address table, the frame forwarding descriptor identifying the frame forwarding information;

means for receiving the frame forwarding descriptors from the plurality of frame lookup components and transmitting the plurality of received frame forwarding descriptors to output queues; and means for transmitting the frames associated with the frame forwarding descriptors to output ports based on the content of the frame forwarding descriptors.

* * * * *